(12) United States Patent
Sadana et al.

(10) Patent No.: US 10,938,653 B2
(45) Date of Patent: Mar. 2, 2021

(54) SYSTEM AND METHOD OF UPDATING A NETWORK

(71) Applicant: Arista Networks, Inc., Santa Clara, CA (US)

(72) Inventors: Anshul Sadana, Santa Clara, CA (US); Ashwin Kohli, Forest Hills, NY (US); Lincoln Travis Dale, Mountain View, CA (US)

(73) Assignee: Arista Networks, Inc., Santa Clara, CA (US)

( * ) Notice: Subject to any disclaimer, the term of this patent is extended or adjusted under 35 U.S.C. 154(b) by 1044 days.

(21) Appl. No.: 15/096,145

(22) Filed: Apr. 11, 2016

(65) Prior Publication Data

US 2016/0315803 A1 Oct. 27, 2016

Related U.S. Application Data

(60) Provisional application No. 62/183,130, filed on Jun. 22, 2015, provisional application No. 62/150,787, filed on Apr. 21, 2015.

(51) Int. Cl.
*G06F 15/16* (2006.01)
*G06F 12/16* (2006.01)
(Continued)

(52) U.S. Cl.
CPC ........ *H04L 41/082* (2013.01); *H04L 41/0859* (2013.01); *H04L 41/0869* (2013.01)

(58) Field of Classification Search
CPC ............... G06F 11/008; G06F 11/1407; G06F 11/1435; G06F 11/1448; G06F 11/1469; H04L 41/0863; H04L 47/33
See application file for complete search history.

(56) References Cited

U.S. PATENT DOCUMENTS 6,594,744 B1 * 7/2003 Humlicek ............. G06F 3/0601
707/999.202
7,383,541 B1 6/2008 Banks et al.
(Continued)

FOREIGN PATENT DOCUMENTS

JP 2012-221268 11/2012

OTHER PUBLICATIONS

Sanidhya Kashyap, "Instant OS Updates via Userspace Checkpoint-and-Restart", 2016, 2016 USENIX annual technical conference.*
(Continued)

*Primary Examiner* — Nicholas R Taylor
*Assistant Examiner* — Ho T Shiu
(74) *Attorney, Agent, or Firm* — Fountainhead Law Group P.C.

(57) ABSTRACT

A method and apparatus of a device that updates boot images of a network segment of a network is described. In an exemplary embodiment, the device receives a configuration point for the network segment, where the network segment includes a heterogeneous mix of a plurality of network elements. For each of the plurality of network elements in the network segment, the device identifies a boot image for that network element corresponding to the configuration point and updates the network element. The boot image for a network element includes the software that network element runs and a configuration of this software.

14 Claims, 8 Drawing Sheets

(51) Int. Cl.
*G06F 9/44* (2018.01)
*G06F 9/445* (2018.01)
*H04L 12/703* (2013.01)
*H04L 12/801* (2013.01)
*H04L 29/08* (2006.01)
*H04L 12/24* (2006.01)

(56) References Cited

U.S. PATENT DOCUMENTS

| | | | |
|---|---|---|---|
| 7,483,370 B1 | 1/2009 | Dayal et al. | |
| 7,506,335 B1* | 3/2009 | Wooff | G06F 8/61 |
| | | | 717/173 |
| 8,627,137 B1 | 1/2014 | Vaidya et al. | |
| 8,930,318 B1* | 1/2015 | Petkov | G06F 11/1423 |
| | | | 707/649 |
| 8,943,490 B1 | 1/2015 | Jain et al. | |
| 2003/0202473 A1 | 10/2003 | Patrick et al. | |
| 2003/0212752 A1 | 11/2003 | Thunquest et al. | |
| 2003/0210705 A1 | 12/2003 | Seddigh et al. | |
| 2005/0078656 A1 | 4/2005 | Bryant et al. | |
| 2005/0267951 A1 | 12/2005 | Joshi et al. | |
| 2006/0007944 A1 | 1/2006 | Movassaghi et al. | |
| 2006/0143432 A1 | 6/2006 | Rothman et al. | |
| 2009/0132791 A1 | 5/2009 | Lo | |
| 2009/0185496 A1 | 7/2009 | Doverspike et al. | |
| 2009/0190478 A1 | 7/2009 | Li et al. | |
| 2009/0279549 A1 | 11/2009 | Ramanathan et al. | |
| 2010/0002577 A1 | 1/2010 | Moreno et al. | |
| 2010/0027427 A1 | 2/2010 | Kokje et al. | |
| 2011/0107322 A1 | 5/2011 | Hashiguchi | |
| 2011/0158113 A1 | 6/2011 | Nanda et al. | |
| 2012/0151443 A1 | 6/2012 | Rohde et al. | |
| 2013/0290945 A1 | 10/2013 | Sawal et al. | |
| 2013/0305236 A1 | 11/2013 | Ramanathan et al. | |
| 2014/0019661 A1 | 1/2014 | Hormuth et al. | |
| 2014/0032889 A1 | 1/2014 | Koenen et al. | |
| 2014/0050077 A1 | 2/2014 | Kasat et al. | |
| 2014/0059530 A1 | 2/2014 | Banavalikar et al. | |
| 2014/0258479 A1 | 9/2014 | Tenginakai | |
| 2014/0269254 A1 | 9/2014 | Choorakkot et al. | |
| 2015/0040115 A1* | 2/2015 | Capper | G06F 8/63 |
| | | | 717/171 |
| 2016/0055579 A1 | 2/2016 | McDonough et al. | |
| 2016/0057052 A1* | 2/2016 | Zhang | H04L 45/28 |
| | | | 709/239 |
| 2016/0313985 A1 | 10/2016 | Sprygada et al. | |
| 2017/0168803 A1 | 6/2017 | Katiyar et al. | |

OTHER PUBLICATIONS

PCT International Search Report and Written Opinion for PCT International Appln No. PCT/US2016028171 dated Jul. 11, 2016. (11 pages).

PCT International Search Report and Written Opinion for PCT International Appln No. PCT/US2016028170 dated Jul. 8, 2016. (12 pages).

European Patent Office, Extended European Search Report, EP Application No. 16783663A, dated Aug. 14, 2018, 9 pages.

Dennis Schwerdel et al., "German-Lab Experimental Facility", Sep. 20, 2010, 10 pages.

* cited by examiner

CFG TABLE 110

| NE | CFG # | BOOT IMAGE | TIMESTAMP |
|---|---|---|---|
| NE 104A | CFG 202A | BOOT IMAGE 204A | TS 206A |
| | CFG 202B | BOOT IMAGE 204A | TS 206B |
| | ... | ... | ... |
| | CFG 202G | BOOT IMAGE 204B | TS 206G |
| NE 104D | CFG 202A | BOOT IMAGE 204A | TS 206A |
| | CFG 202B | BOOT IMAGE 204C | TS 206B |
| | ... | ... | ... |
| | CFG 202G | BOOT IMAGE 204G | TS 206G |
| NE 106A | CFG 202A | BOOT IMAGE 208A | TS 206A |
| | CFG 202B | BOOT IMAGE 208B | TS 206B |
| | ... | ... | ... |
| | CFG 202G | BOOT IMAGE 208D | TS 206G |
| NE 106C | CFG 202A | BOOT IMAGE 210A | TS 206A |
| | CFG 202B | BOOT IMAGE 210A | TS 206B |
| | CFG 202C | BOOT IMAGE 210B | TS 206C |
| | ... | ... | ... |
| | CFG 202G | BOOT IMAGE 210C | TS 206G |

FIGURE 2

SYSTEM AND METHOD OF UPDATING A NETWORK

This application claims the benefit of U.S. Provisional Patent Application No. 62,183,130 filed Jun. 22, 2015 and U.S. Provisional Patent Application No. 62/150,787 filed Apr. 21, 2015, of which are hereby incorporated by reference.

FIELD OF INVENTION

This invention relates generally to data networking, and more particularly, to updating network element boot images across a network.

BACKGROUND OF THE INVENTION

For a network with multiple network elements, each network element runs a particular version of software along with a specific configuration for that software. Periodically, the software and/or the configuration of one or more of the network elements are updated. Sometimes the software and/or configuration updates leads to poor performance or disruption because of problems with the software configuration, incompatibilities between different software configurations on different network elements, loss of connectivity due to incorrect Virtual Local Area Network (VLAN) membership change on a port, incorrect Access Control List (ACL) entry, incorrect route metric change, or other types of problems.

If a problem arises in the network due to a configuration or software issue, it can be useful to roll back the configuration and/or software of the network elements in the network to a stable point at which the configuration and software of the network elements did not exhibit these issues. However, downgrading multiple network elements at once can be tedious and fraught with errors. Downgrading multiple network elements is done one network element at a time where the network administrator selects the desired software for that network element, updates the software on the network element, and further configures the network element software. This can be a tedious procedure for network with many different types of network elements, running different software, and with many different configurations.

SUMMARY OF THE DESCRIPTION

A method and apparatus of a device that updates boot images of a network segment of a network is described. In an exemplary embodiment, the device receives a configuration point for the network segment, where the network segment includes a heterogeneous mix of a plurality of network elements. For each of the plurality of network elements in the network segment, the device identifies a boot image for that network element corresponding to the configuration point and updates the network element. The boot image for a network element includes the software that network element runs and a configuration of this software.

In another embodiment, a device validates a boot image update of a network element. In this embodiment, the device determines a first snapshot of the network element, where the first snapshot includes local operating information of the network element. The device updates the boot image of the network element to a different boot image. The device further determines a second snapshot of the network element that is running the different boot image. In addition, the device fails the update if the first snapshot is different from the second snapshot.

In a further embodiment, the device performs a hitless update a boot image of a network element. In this embodiment, the device identifies the network element to update and determines if the network element has redundant links. If this network element has redundant links, the device configures the network element to drain data processing of the network element. In addition, the device updates the network element to a new boot image when the data processing of the network element is drained.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 2 is a block diagram of one embodiment of a configuration table that tracks boot images of network elements at different configuration points.

DETAILED DESCRIPTION

Figure 1:
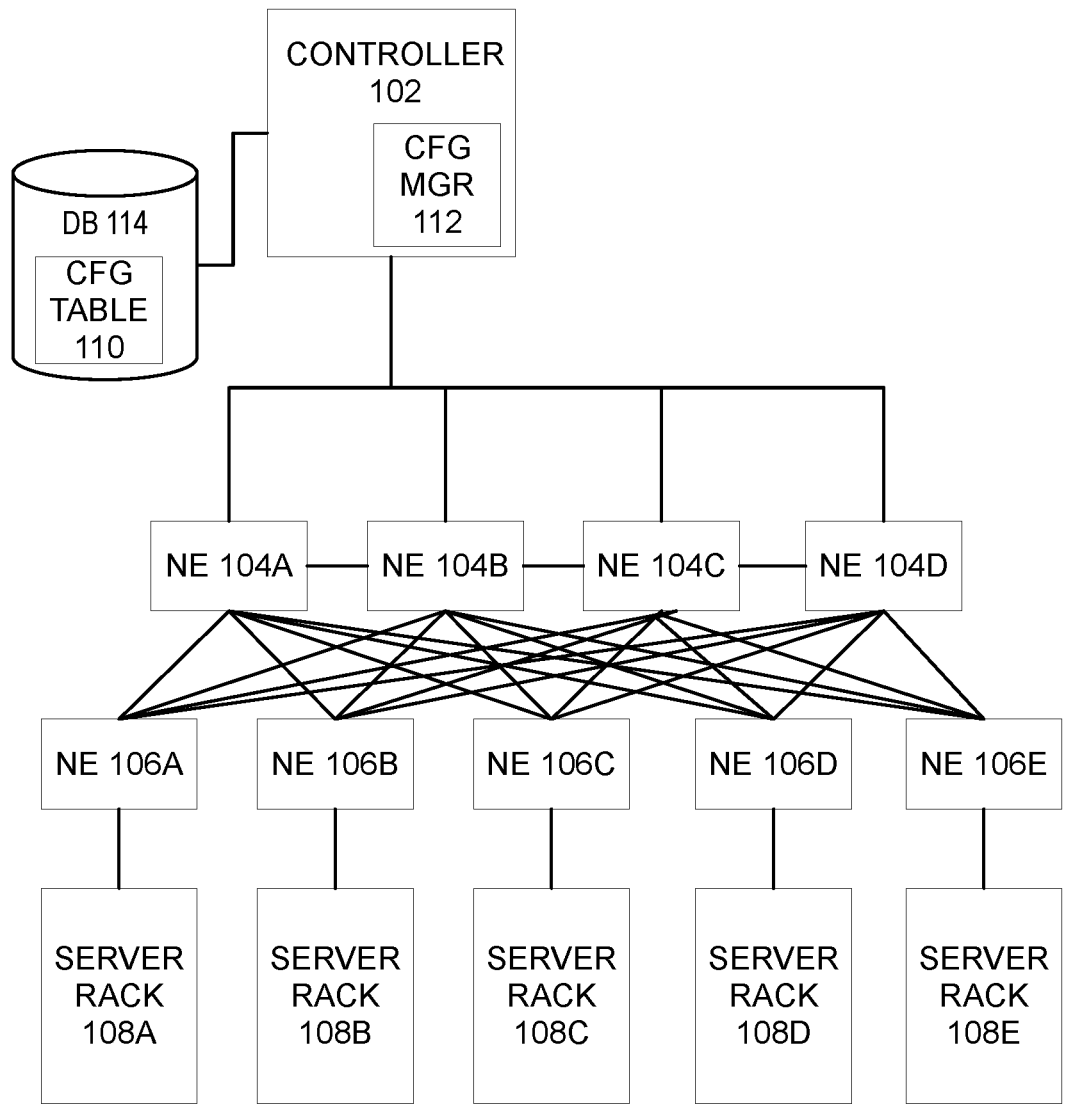
FIG. 1 is a block diagram of one embodiment of a network with a controller that updates the boot images of the network elements in the network.

A method and apparatus of a device that updates boot images of a network segment of a network is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that updates boot images of a network segment of a network is described. In one embodiment, the device tracks different sets of software and configuration combinations installed on multiple network elements in a network. Each unique set of software configurations for the network elements for a particular time is collected into a configuration point. In this embodiment, the configuration point includes boot image designation for each network element and a corresponding timestamp. A boot image is a combination of a particular version of software for network element with a particular configuration applied to the software for the network element. The software is a set of programs that is used to manage and run the network element (e.g., Operating system, firmware, or another type of software that is used to manage and run the network element). A change in a software version or configuration will lead to a new boot image. With the collection of configuration points, an operator can easily rollback boot images of the network elements to a different configuration point as desired. In one embodiment, the operator selects the desired configuration point and the device determines which boot images are applied to which network elements. For each network element and corresponding target boot image, the device updates the network element with this target boot image. The updates can be a downgrade to a lower version software, an upgrade to a higher version software, or reinstall the same software on this network on. In addition, the update can be the same or different software with a different configuration applied to that software. The network element boot image updates can be a hitless update, where there is no data loss during the update, or a hit full update, or someday a loss can happen.

In another embodiment, the device can validate an update of the network element by acquiring an initial snapshot of the local operating information of the network element prior to the update, performing the update to the boot image of the network element, acquiring a second snapshot, and comparing the two snapshots for differences. If there are differences (or significant differences) between the two snapshots, the device determines that the update failed. In this case, the device can signal failure, roll back the update, or perform another action regarding the failed update. If the update succeeds, the device can signal that the update succeeded.

In a further embodiment, the device can perform a hitless update of a boot image on a network element by draining the data processing requirements of that network element and performing the boot image update. In this embodiment, the device determines if a network element has redundant links. A network element may have redundant links if this network element participates in an equal cost multipath group, a link aggregation group. Or another type of protocol in which the network element along with other network elements appear as one for the purpose of forwarding data. If the network element does have redundant links, the device can configure the network element so as to increase the forwarding costs of that network element. In this embodiment, the network element advertises its forwarding costs to other network elements. With this high forwarding cost, this network element will be disfavored and the data flow will be diverted to other network elements that are redundant to this network element. For example and in one embodiment, the device could increase the Border Gateway Protocol cost, which would divert data to be forwarded by this network element to the other network elements that participate in the equal cost multipath group. After the data has been drained from this network element, the device updates the boot image of this network element. With the update completed, the device changes the forwarding cost back to the value prior to the update, so that the data is forwarded to the network element again.

FIG. 1 is a block diagram of one embodiment of a network 100 with a controller 102 that updates the boot images of the network elements in the network. In FIG. 1, the network 100 includes spine network elements 104A-D that are coupled to each of the leaf network elements 106A-E. The leaf network elements 106A-E are further coupled to server racks 108A-E, respectively. In one embodiment, a spine network element 104A-D is a network element that interconnects the leaf network elements 106A-E. In this embodiment, each of the spine network elements 104A-D is coupled to each of the leaf network elements 106A-E. Furthermore, in this embodiment, each of the spine network elements 104A-D are coupled with each other. While in one embodiment, the network elements 104A-D and 106A-E are illustrated in a spine and leaf topology, in alternate embodiments, the network elements 104A-D and 106A-E can be in a different topology. In addition, and in one embodiment, the network elements 104A-E are further coupled to a controller 102 and a database 114. In one embodiment, each of the network elements 104A-D and/or 106A-E can be a router, switch, bridge, gateway, load balancer, firewall, network security device, server, or any other type of device that can receive and process data from a network. In one embodiment, the network elements 104A-D and 106A-E can be the same or different network elements in terms of manufacturer, type, configuration, or role. For example and in one embodiment, network elements 104A-D may be routers and network elements 106A-E may be switches. As another example and embodiment, network elements 104A-D may be high capacity switches with relatively few 10 gigabit (Gb) or 40 Gb ports and network elements 106A-E may be lower capacity switches with a large number of medium capacity port (e.g., 1 Gb ports). In addition, the network elements may differ in role, as the network elements 104A-D are spine switches and the network elements 106A-E are leaf switches. Thus, the network elements 104A-D and 106A-E can be a heterogeneous mix of network elements.

In one embodiment, the controller 102 is a device that is used to support network-wide services for a network that includes multiple network elements. A network-wide service is a service that is used by two or more network elements. For example, the network-wide service can be a service that gathers known Media Access Control (MAC) addresses and assembles these addresses into a global MAC address database. This global MAC address database can be used to support a VxLAN controller service. In one embodiment, database 114 is an organized collection of data. As another example and embodiment, the ability to rollback or roll forward network elements to different configuration points is a network-wide service.

Each of the network elements 104A-D and 106A-E will run a particular version of software that is used to process data that is received from a network (e.g., Operating system, firmware, or other type of software that is used to control the network element). In this embodiment, the network elements 104A-D and 106A-E may or may not be running the same version of software. Furthermore, the network elements 104A-D and 106A-E may not be the same type of network element or even network elements that are from the same vendor. For example and one embodiment, the spine network elements 104A-D may be running a software version 4.0.5, whereas the leaf network elements 106A-E may be running a different software such as correct that, such as version 14.1.0 for network elements 104A-C and version 14.0.8 for network elements 104D and 104E. In addition, each of the network elements 104A-D and 106A-E will have a configuration associated with that network element. In one embodiment, the network element configuration defines the role of the network element and the policies, priorities and rules associated with forwarding and/or processing of data between ports of the network element. A configuration can change, over time, due to an operator initiated change in the configuration (e.g., adding or removing a service, changing the configuration of the service on the network element, changing a configuration parameter of the network element, and/or the role, policy, priority, or rule associated with forwarding or processing of data) or from changes due to data being received by the network element (e.g., advertised forwarding information, addressing information, or other types of configurational information received by the network element).

In one embodiment, the combination of the software and network element is running and the configuration of that network element combine to give a boot image for that network element. In this embodiment, software that has two different configurations associated with it will result in two different boot images for that network element. This is because, as the configuration changes for network element, the functionality of that network element may change as well. Similarly, if a network element has the same configuration for two different versions of the software, that network element would have to different boot images.

As described above, each of the network elements 104A-D and 106A-E can each be running the same or different software that may or may not be configured the same. Thus, at a particular point in time, each of these network elements 104A-D and 106A-E will have a particular boot image. This collection of boot images for the different network elements 104A-D and 106A-E at a particular time is called the configuration point for this network. In an alternative embodiment, there can be a configuration point for segment of the network. For example and one embodiment, there could be a configuration point for the network segment that is network elements 104A-D, the network elements 106A-E, or any other combination of the network elements. In one embodiment, changes in a network elements software or configuration will change the configuration point for the network into a different configuration point. For example in one embodiment, if the network 100 had a configuration point A and network element 106C had its configuration changed (e.g., A service on this network element was brought up or taken down), then network 100 would have a new configuration point, configuration point B.

The controller 102, in one embodiment, can save descriptions of the different configuration points using the configuration manager 112. In this embodiment, the configuration manager 112 keeps a table of the different boot images for each of the network elements that the controller 102 is managing. For example in one embodiment, the configuration manager 112 keeps a table that includes the configuration points over time, where each of the configuration points includes what boot image is configured on what network element at a particular point in time. In addition, the configuration manager 112 may also store this configuration table 110 in the database 114. In an alternate embodiment, the configuration manager 112 may further store the actual boot images of the network elements 104A-D and 106A-E in the database 114 as well. Alternatively, the configuration manager 112 may store the different versions of software and corresponding configurations in the database 114.

By tracking the different configuration points, the configuration manager 112 can perform wholesale rollbacks (or equivalently, roll forwards) of the boot images for the network 100. In this embodiment, the configuration manager 112 can rollback the boot images network elements 104A-D and 106A-E from one configuration point to another. For example and in one embodiment, the configuration manager 112 can roll back the network elements 104A-D and 106A-E from the boot images in configuration point E to configuration point C. This may be done because configuration point E may be unstable for certain features or services of network 100, and by rolling back the boot images of network elements 104A-D and 106A-E back to configuration point C, these features or services of network 100 will be more stable. Conversely, the configuration manager 112 may roll forward the boot images of network elements 104A-D and 106A-E from configuration point C to configuration point G. For example and in one embodiment, rolling forward of a multiple network elements would be to upgrade the network elements to a new software release in order to make use of a new feature/function or because there are some bugs that were fixed in a software update.

In one embodiment, the configuration manager 112 performs the rollbacks (or equivalently roll forwards) by updating the boot images for some or all of the network elements 104A-D and 106A-E. In this embodiment, an update to a boot image of a network element can be a downgrade to boot image previously used with a corresponding lower version software, an upgrade to boot image with a corresponding higher version software, or replacement boot image that has the same version software as currently running on that network element. This update to the boot image can be a hitless update or hit full update. In one embodiment, a hitless update to a network element, or group of network elements, is an update to the boot image that does not cause a loss in data processing. In this embodiment, a hitless update is performed and there is no loss or dropping of data packets by the network elements that are being updated. In contrast, a hit full update is an update of a boot image to a network element, or group of network elements, where there can be a loss or dropping of data packets by the network elements that are being updated. The configuration table 110 is further described in FIG. 2 below.

FIG. 2 is a block diagram of one embodiment of a configuration table 110 that tracks boot images of network elements at different configuration points. In FIG. 2, the configuration table 110 includes information regarding the network elements, the configuration point, the boot image, and the timestamp. In one embodiment, and as illustrated in FIG. 2, network element 104A has entries for seven configuration points, configuration 202A-G. At each of the configuration points, configurations 202A-G, a network element listed in the configuration table will have a boot image designation stored along with a timestamp for that configuration point. In this embodiment, the network element 104A has boot image 204A and timestamp 206A for configuration 202A. Furthermore, network element 104A has boot images 204A and timestamp 206B for configuration 202B, and boot image 204B and timestamp 206G for configuration 202G. This means that the boot image was the same for network element 104A at the two different configurations of 202B and 202G. These boot images could change due to a software change or a configuration change. Another entry in the configuration table 110 has network element 104D with configurations 202A-G, where configuration 202A has boot image 204A and timestamp 206A, configuration 202B has boot image 204C and timestamp 206B, and configuration 202G has boot image 204G and timestamp 206G. Network element 106A has configurations 202A-G, where configuration 202A has boot image 208A and timestamp 206A, configuration 208B has boot image 208B and timestamp 206B, and configuration 202G has boot image 208D and timestamp 206G. Network element 106C shows configurations 202A-G, where configuration 202A has boot image 210A and timestamp 206A, configuration 202B has boot image 210B and timestamp 206B, and configuration 202G has boot image 210C and timestamp 206G. While in one embodiment, network elements 104A, 104D, 106A, and 106C are illustrated as having entries in the configuration table, in alternate embodiments, some or all of the network elements 104A-D and 106A-E can have entries in the configuration table. In addition, the configuration table may have more or less configuration points for more or less network elements. In alternate embodiments, the configuration table can be organized or structured differently, while mapping a boot image to a network element for a particular point in time.

Figure 3:
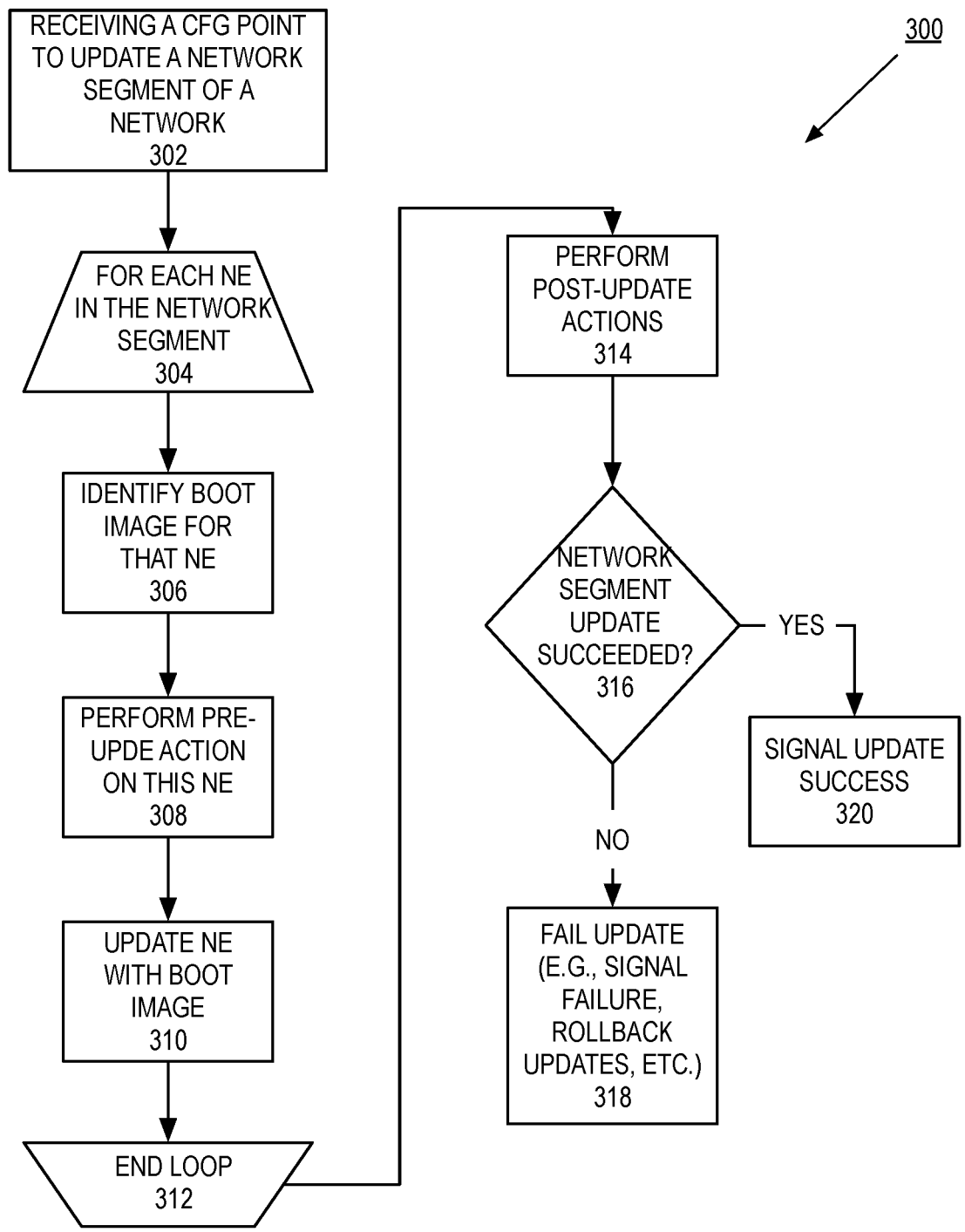
FIG. 3 is a flow chart of one embodiment of a process to update network elements to boot images corresponding to a specific configuration point.

In the discussion above, the configuration manager can control updating multiple network elements to a specific configuration point. FIG. 3 is a flow chart of one embodiment of a process 300 to update network elements to boot images corresponding to a specific configuration point. In one embodiment, process 300 is performed by configuration manager to update the network images to boot images corresponding to a specific configuration point, such as configuration manager 102 as illustrated in FIG. 1 above. In FIG. 3, process 300 begins by identifying the network segment update at block 302. In one embodiment, the network segment to update can include some or all of the network elements that process 300 is associated with. At block 304, process 300 performs a processing loop (blocks 304-312) to update each network elements within the identified network segment. At block 306, process 300 identifies the boot image for that network element. In one embodiment, process 300 identifies the boot image by looking up the boot image for that network element and the desired configuration point in the configuration table. For example in one embodiment, process 300 identifies the boot image by looking up the boot image for that network element for the corresponding configuration point in the configuration table.

Process 300 performs pre-update actions on this network element at block 308. In one embodiment, process 300 takes a snapshot of the local operating information of this network element. In this embodiment, the snapshot is used to validate the update of the network element by comparing the local operating information before and after the update. Validating an update using snapshots of local operating information is further described in FIG. 4 below. In another embodiment, process 300 can prepare the network element for an update by draining the data forwarded to this network element. For example in one embodiment, a forwarding cost for the network element can be made prohibitively high, such that data is forwarded to other network elements for processing. Preparing a network element by draining the data is further described in FIG. 5 below.

At block 310, process 300 updates the network element with the new boot image. In one embodiment this update can be a roll back to a previous boot image, roll forward to a new boot image, or replacement with the same boot image. In one embodiment, the update can be a hitless update or a hit full update. The update may or may not involve a reboot of this network element. The processing loop ends at block 312.

Process 300 performs post update actions at block 314. In one embodiment, a post update action performed by process 300 can be taking a snapshot of the local operating information of the network element, which is use to compare with a snapshot taken prior to the network element being updated. In another embodiment, process 300 reverses any configuration changes made to the network element so as to drain the data prior to the update. At block 316, process 300 determines if the update succeeded. In one embodiment, process 300 can determine if the update succeeded by comparing snapshots using a number of possible metrics that are checked before and after. For example and in one embodiment, process 300 can determine if every device known to the network elements is still known to the network element after the upgrade, determine if network element health checks have improved, and/or other types of metrics. If the update succeeded, process 300 signals that the update was a success. If the update did not succeed, process 300 fails the update (e.g., signal a failure, roll back the updates, or another way of failing the update).

Figure 4:
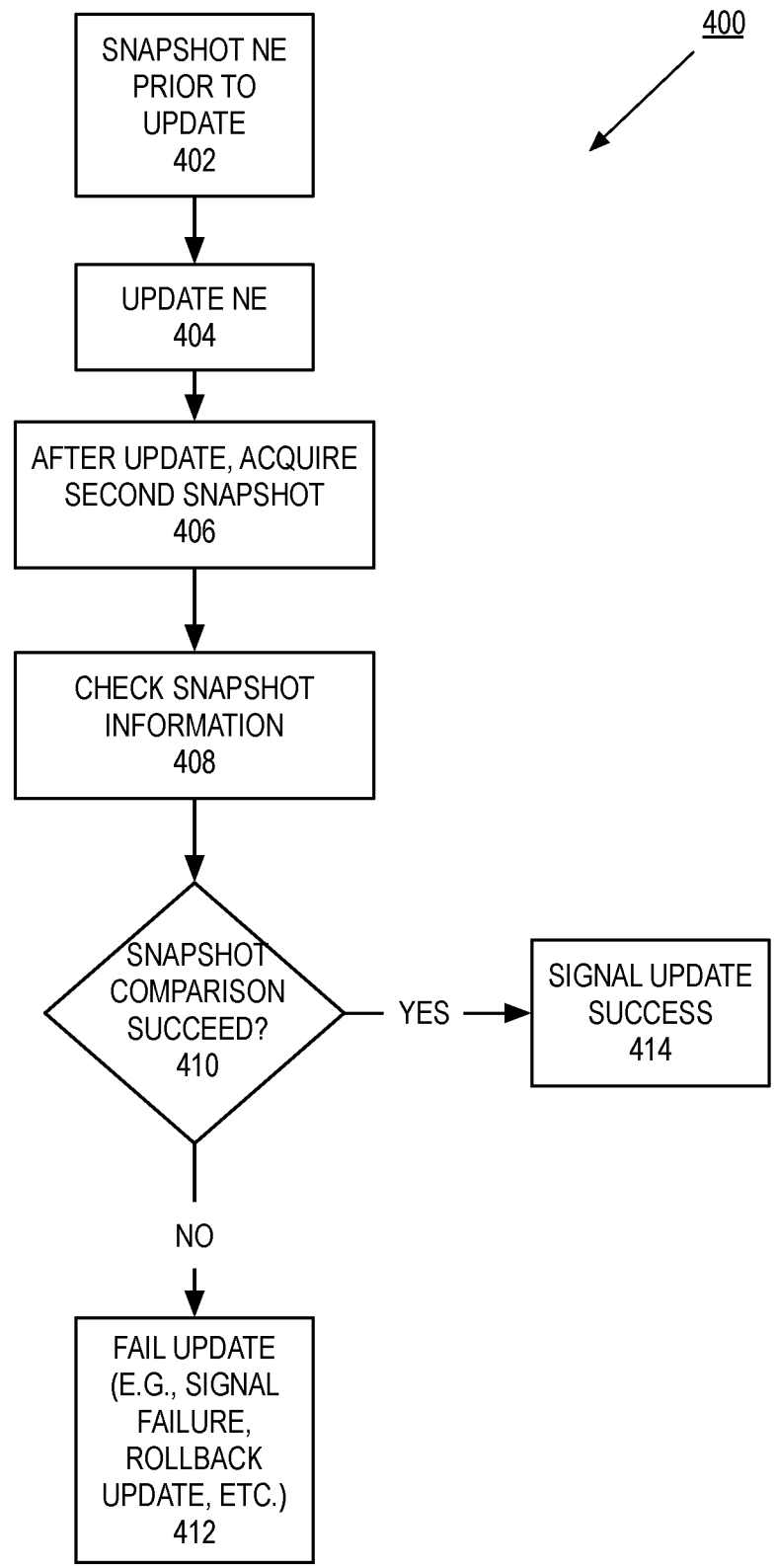
FIG. 4 is a flow chart of one embodiment of a process to validate an update to a network element based on a comparison of snapshots for the network element.
Figure 7:
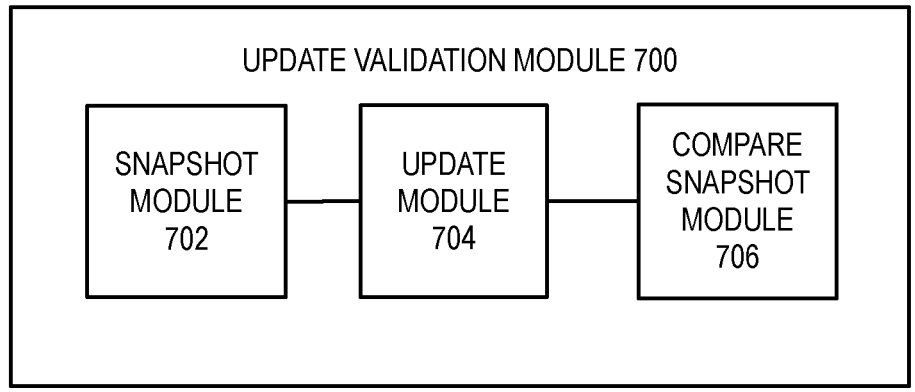
FIG. 7 is a block diagram of one embodiment of an update validation module that validates an update to a network element based on a comparison of snapshots for the network element.

As described above, the network elements can be updated with a new boot image. After the network element is updated with a new boot image, it is useful to validate that boot image, so that an unsuccessful update is caught early after the update process has completed. FIG. 4 is a flow chart of one embodiment of a process 400 to validate an update to a network element based on a comparison of snapshots for the network element. In one embodiment, process 400 is performed by an update validation module to update the network images to boot images corresponding to a specific configuration point, such as the update validation module 700 as illustrated in FIG. 7 below. In FIG. 4, process 400 begins by acquiring a snapshot of the local operating information for a network element prior to a new boot image being updated on that network element at block 402. In one embodiment the local operating information for a network element can include link information, topology information, neighbors, peers, routing information (e.g., Border Gateway protocol (BGP) information), error information, health check information (e.g., Cyclic redundancy check (CRC) information, health probes and checks), MAC tables, link aggregation peers, ECMP peers, other types of local operating information, and/or a combination thereof. In this embodiment, the snapshot can be taken before and after an update to a network element's boot image, so as to determine if the update succeeded. At block 404, process 400 updates the network element. In one embodiment, the update can be a hitless update or a hit full update. For example and in one embodiment, process 400 updates the boot image of the network element using the accelerated software upgrade as described in U.S. patent application Ser. No. 14/449,030, entitled "System and Method for Accelerated Software Upgrades", filed on Jul. 31, 2014.

Process 400 requires a second snapshot after the update at block 406. In one embodiment, process 400 acquires the same type of information for the second snapshot that was acquired for the initial snapshot prior to the update. At block 408, process 400 compares the two snapshots for differences. In one embodiment, the snapshots are different if the local operating information in the second snapshot is different from the corresponding information in the first snapshot. For example and in one embodiment, if the second snapshot does not have the same link, neighbor, or peer information, then the second snapshot is different. As another example and in another embodiment, if there are no CRC errors for a link in the first snapshot, but these errors are present in the second snapshot, then the second snapshot is different. In one embodiment, having a second snapshot that is different may be an indication that the boot image update failed. At block 410, process 400 determines if the snapshot comparison succeeded. In one embodiment, the snapshot comparison succeeds if there are no differences between the information in the two snapshots. In an alternative embodiment, the snapshot comparison succeeds if the difference between the two snapshots is minor. In this embodiment, the two snapshots may differ in information that does not affect the operation of the network element. If the snapshot comparison succeeds, process 400 signals an update of success at block 414. If the snapshot comparison did not succeed, at block 412, process 400 fails the update (e.g., signals a failure, rolls back the update, or another way of failing the update).

Figure 5:
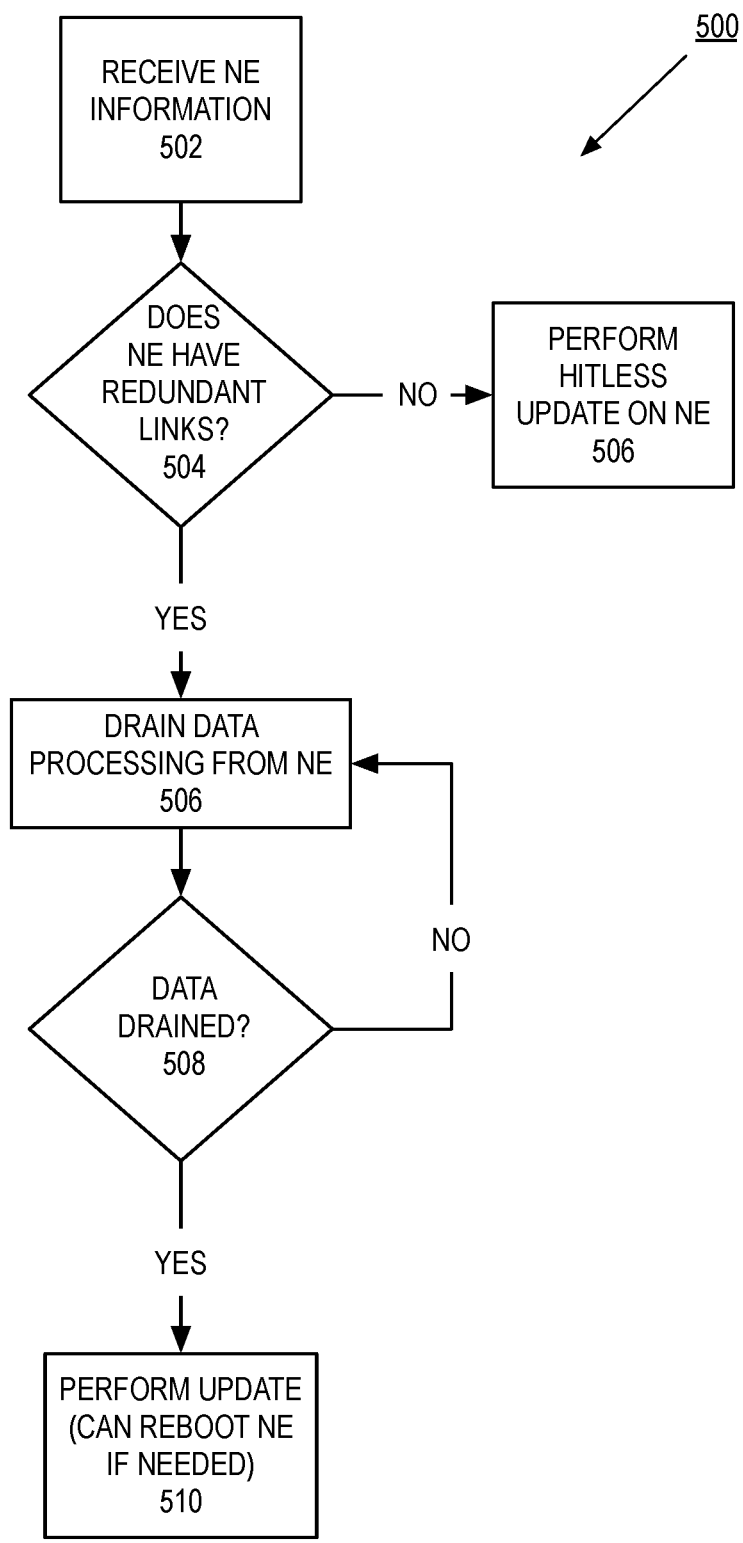
FIG. 5 is a flow diagram of one embodiment of a process to update a network element by utilizing redundant network capacity.

A boot image update can be performed as a hitless or a hit full update. In one embodiment, a hitless update can be performed by draining the data processing needs on a network element that has redundant links with other network elements. FIG. 5 is a flow diagram of one embodiment of a process 500 to update a network element by utilizing redundant network capacity. In one embodiment, process 500 is performed by a network update module, such as the network update module described in FIG. 8 below. In FIG. 5, process 500 begins by receiving the network element information for the network element that is to be updated with a new boot image at block 502. In one embodiment, the network element information received includes information whether the network element has redundant links such that data processing can be diverted to other network elements while the network element boot images being updated. At block 504, process 500 determines if the network element has redundant links. In one embodiment, a network element has redundant links if there are other network elements that can perform the data processing the network element is currently performing. For example and in one embodiment, the network elements may be part of an equal cost multipath group or a link aggregate group that allows for multiple network elements to appear as one network element. As illustrated in FIG. 1 above, network elements 104A-D have redundant links that allow others of these network elements to take over the data processing for one of the network elements. If network element 104A went off-line (e.g., to update a boot image), the other network elements 104B-D can take over the data processing for network element 104A. If the network element does not have redundant links, process 500 performs a hitless update on the network element at block 506. In one embodiment, process 500 performs an accelerated software upgrade on the network element as described in U.S. patent application Ser. No. 14/449,030, entitled "System and Method for Accelerated Software Upgrades", filed on Jul. 31, 2014.

If the network element does have redundant links, at block 508, process 500 drains the data processing from that network element. In one embodiment, by draining the data processing from the network element, process 500 is diverting the flow of data to the other network elements that this network element has redundant links with. In one embodiment, process 500 drains the data processing from the network element by increasing the cost for forwarding the data. In this embodiment, the network element will advertise its forwarding costs such that the flow of data will be diverted to the other network elements. For example and in one embodiment, network element 104A can increase the BGP cost to a large number (e.g., a large value or infinity) and advertise this cost, such that data will be diverted to network elements 104B-D. By increasing this forwarding cost, where the network element will advertise this cost, no data will eventually be forwarded to this network element. When no data is being forwarded to this network element, process 500 can update the boot image of this network element without any data loss. At block 510, process 500 determines if the data is drained from the network element. If the data is not drained from the network element, execution proceeds to block 508 above. If the data is drained from the network element, process 500 for firms the boot image update. In one embodiment, process 500 can perform the boot image update that involves a reboot of the network element. In this embodiment, even though the network element is rebooted during the boot image update process, this update is hitless because no data is lost.

Figure 6:
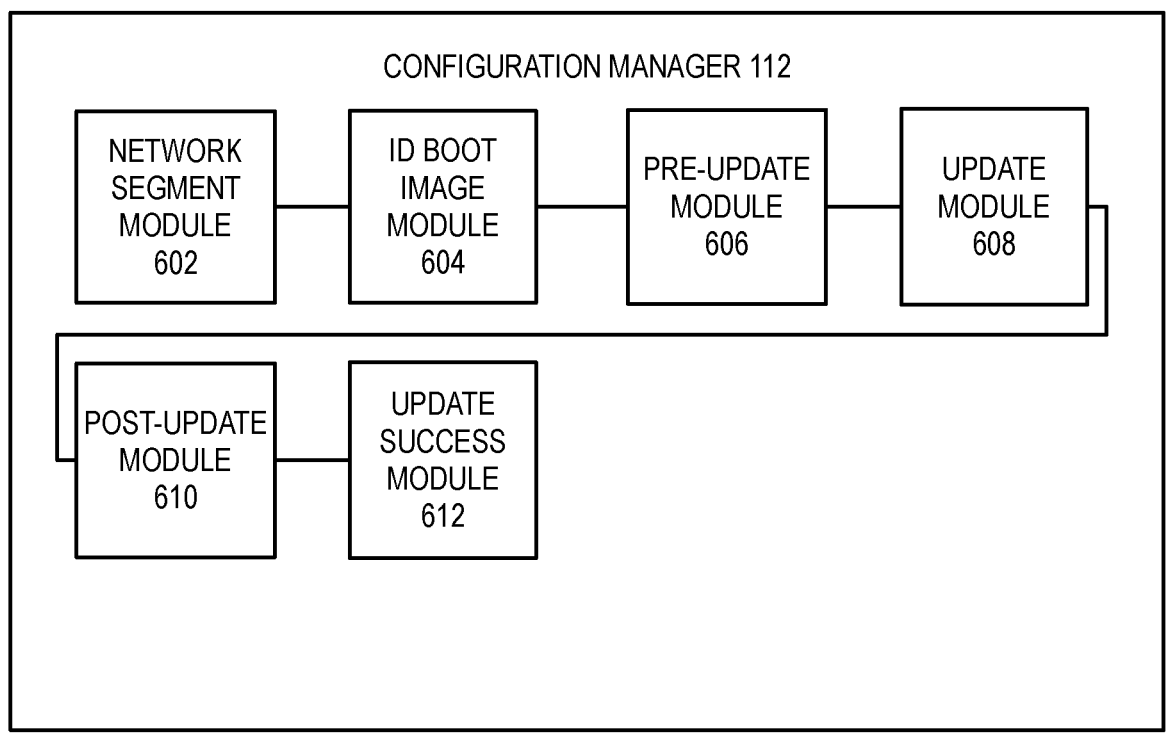
FIG. 6 is a block diagram of one embodiment of a configuration module that updates network elements to boot images corresponding to a specific configuration point.

FIG. 6 is a block diagram of one embodiment of a configuration module 112 that updates network elements to boot images corresponding to a specific configuration point. In one embodiment, the configuration manager 112 includes a network segment module 602, identify boot image module 604, pre-update module 606, update module 608, post update module 610, and update success module 612. In one embodiment, the network segment module 602 identifies the network segment to update as described in FIG. 3, block 302 above. The identify boot image module 604 identifies a boot image for a network element as described in FIG. 3, block 306 above. The pre-update module 606 performances the pre-update actions as described in FIG. 3, block 308 above. The update module 606 updates the network element with a new boot image as described in FIG. 3, block 310 above. The post update module 610 performs post update actions as described in FIG. 3, block 314 above. The update success module 612 determines if the update was successful as described in FIG. 3, block 316 above.

FIG. 7 is a block diagram of one embodiment of an update validation module 700 that validates an update to a network element based on a comparison of snapshots for the network element. In one embodiment, the update validation module 700 includes a snapshot module 702, pre-update module 704, and compare snapshot module 706. In one embodiment, the snapshot module 702 acquires the snapshot as described in FIG. 4, blocks 402 and 406 above. The update module 704 updates the network element as described in FIG. 4, block 404 above. The compare snapshot module compares the two snapshots as described in FIG. 4, block 408 above.

Figure 8:
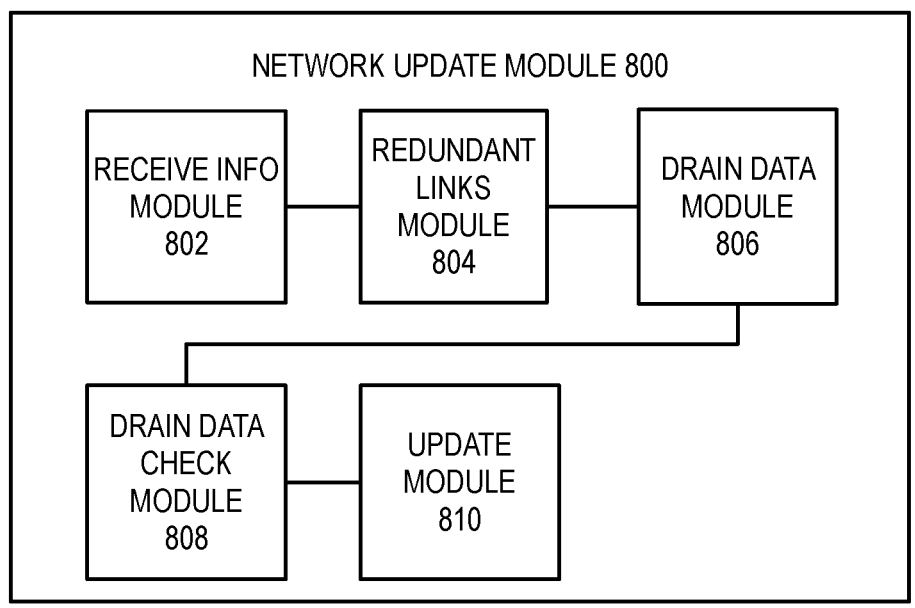
FIG. 8 is a block diagram of one embodiment of a network update module that updates a network element by utilizing redundant network capacity.

FIG. 8 is a block diagram of one embodiment of a network update module 800 that updates a network element by utilizing redundant network capacity. In one embodiment, the network update module 800 includes a receive information module 802, redundant links module 804, drain data module 806, drain data check module 808, and update module 810. In one embodiment, the receive information module 802 receives the network element information as described in FIG. 5, block 502 above. The redundant links module 804 determines if the network element has redundant links as described in FIG. 5, block 504 above. The drain data module 806 drains the data processing from the network element as described in FIG. 5, block 508 above. The drain data check module 808 determines if the data processing has been drained from the network element as described in FIG. 5, block 508 above. The update module updates the network elements as described in FIG. 8, block 810 above.

Architecting a fault tolerant and resilient network fabric is one part of the challenge facing network managers and operations teams today. It is simply not good enough to build a scalable fault tolerant network. Typical data centers can range from tens, to hundreds or thousands of networking devices. Operational tasks alone at this scale have created a tremendous set of challenges faced by the implementation and operations teams. Often the cost of these challenges outweighs the benefits of introducing a new vendor or emerging technology.

To meet these challenges, network operations teams can cobble together a basket full of reactive software tools in order to manage, monitor, and raise alarms for a network system on a periodic basis. Such tools usually consist of either homegrown scripts or 3rd party tools, which have little or no integration with each other. The end result to these being every network issue ultimately requires human intervention in order to provision, manage, or troubleshoot any infrastructure. This model, however, adds to the complexity and can exponentially increase the operational expenses of running infrastructures of any size. Additionally the use of these tools can be counterproductive to the original business intent, which led to purchase of these tools in order to drive down operational expenses.

Other companies would want to avail themselves of the operational expense savings by the largest cloud companies achieved by using automation techniques. Naturally other companies want to achieve the same significant savings in their environment also. However, most of these customers are handcuffed in moving forward with automation solutions, as they simply: (i) do not know which solutions to deploy, (ii) do not how to go about doing it, (iii) do not have the budget, and/or (iv) do not have the resources to engage down this journey. What these customers need is a turnkey solution to enable them to embark on this journey, initially 'holding their hand' before allowing them to mature to more advanced levels of customized automation.

At the end of the day, businesses need to be able to simplify data center operations. The main reason they need to do this is to enable "business agility & flexibility" for workloads and workflows. This flexibility helps them drive their businesses at a more rapid pace.

The advantage that the controller described above and further below to a data center is not only a reduction in capital expense costs, but also access to the benefits of a software driven cloud solution by leveraging an open and programmable operating system, to drive down operational expenses. In one embodiment, the controller descried below is the CloudVision of Arista Networks. In another embodiment, the controller described below is the controller as described in FIG. 1 above.

To date, much of the network automation deployments to date have been built on two approaches: do-it-yourself and development operations model. In one embodiment, do-it-yourself solutions are typically deployed by cloud titan enterprises that have large dedicated data centers. Often these enterprises have a ten times budget for deploying infrastructure (server, database, network) compared to the largest enterprises. For these cloud titans, data center automation is necessary to their business model as a means to compete in the market place. Such titans also have different application profiles and their applications are designed to account for infrastructure failure. As a result, large software teams are used to write custom designed tools to automate their infrastructure. One way to reduce such reliance on homegrown tools is providing them open tools like software development kits and application programming interfaces (API) with unrestricted access to the kernel to deploy their own scripts to be able to fully customize their network.

In another embodiment, a development operations model, is typically deployed by large Service Providers or larger enterprises. The approach includes prebuilt third party automation frameworks currently being used by the compute teams, such as Puppet, Chef, Ansible, CFEngine or other frameworks to consolidate provisioning tools and apply those frameworks to the network infrastructure to drive down operational expenses. Such customers are large enough to have resource pools available in order to write custom scripts to achieve some of the automation gains in their environment. These customers are more invested in the automation approach with committed resources, budget and vision to achieve the operational expense reduction goals. In one embodiment, by providing open tools like EOS SDK and eAPI with unrestricted access to the kernel to deploy customer own scripts or 3rd party tools like Puppet, Chef, etc., the customer can be able to fully customize their network.

In a further embodiment, to date, there are no real open tools that exist in the marketplace today to guide customers down the path in taking the first steps to network automation. The controller is a new tool providing a turnkey solution including a portal, where the portal specifically allows customers to be able to provision, manage, and gain visibility into an infrastructure without inhibiting customers to be able to take on more complex automation scripts in the future. In one embodiment, the controller is designed to help customers of all sizes, in particular the small-medium business, mid and large sized enterprise across every vertical, which are looking to achieve the same operational expense reductions or potentially having to justify their infrastructure being outsourced to the cloud. As mentioned before, other enterprises have the need and desire to embark on an automation journey, but do not have the time, skillset, or resources to do so. In one embodiment, the controller has the following components: network wide services, workflow automation services, workload orchestration services, and open APIs and partner access.

In one embodiment, the controller includes a state database model, called 'Sysdb'. Sysdb acts as a broker between the many processes that make up operating system of the network elements in the network system, enabling the scale, feature velocity and robustness for of that network element. For example and in one embodiment, Sysdb holds the entire state for that network element, e.g., configuration, topology, protocol state, monitoring counters details, etc.

In one embodiment, most provisioning and monitoring tools are reactive and manage each box individually, e.g., box-by-box solution. There is no holistic view of the whole network to visualize as a complete view.

In one embodiment, the controller changes that operational model by taking a drastically different approach. It is built on the following three characteristics:

Network Wide Service—by taking per switch state, aggregating it to provide consolidated network wide state of network.

Turnkey Automation Solution—By providing the use of a portal to provide turnkey workflows for automation and visibility Single Touch Point—Enable cloud mobility, by providing an open and single point touch point for any 3rd party controllers and orchestration services.

In one embodiment, why is a network wide consolidated view key? Simply put, as an industry, an operator manages the network like it has been for last 25+ years for the next 25 years: box-by-box, provisioned individually, managed separately, no automation, with no correlation to the health of the infrastructure with no real operational expense savings. This is difficult to correlate network-wide.

Thus, in this embodiment, history has shown that this model does not work. So why has this not been done before? Network operating software architecture has not allowed that to happen. With a network element operating system acting as a distributed architecture, the controller is able to aggregate and consolidate the network state to provide a network wide view which provides the operator full proactive visibility of what is going on in the network at all times. This gives network-wide synchronization for topology level visibility.

When a switch is managed, there are typically three things that can be changed on that switch-configuration, image, or a script. Today, most customers may have tools to combine 1 or at best 2 of these items within the same tool. For example and in one embodiment, previous tools would provide several different tools for inventory, syslog, management, compliance, and other types of infrastructure reporting. However, to be fully automated, what is needed is a tool that consolidates these management tasks into one simplified tool.

In one embodiment, the controller bridges that gap, and eliminates the need for using three or more different management tools to provision, manage an infrastructure, and ensure security compliance. This way, customers can reduce their costs of maintaining these separate tools by consolidating them with a single screen that provides a network wide view to make intelligent change decisions and then report to compliance on the state of the infrastructure.

In this embodiment, most networks have multiple devices from the same networking vendor which they have deployed overtime and running different code versions. Traditional inventory management tools are used to monitor platform versions and code versions. However, these tools are not able to provide a service dashboard that actually shows if there are any critical proactive software bugs, manage life cycle code upgrades, and not able to provide security reports. In one embodiment, the controller provides a dashboard of code deployment with real time alerts and/or proactive notification tools of known security and bug patches that need to be patched.

When monitoring tools are deployed, in one embodiment, these tools typically are purchased and deployed in pairs e.g., Active/Backup model or Active/Active model (rarely seen in traditional enterprise management tools). The challenge is that typically this type of tool would be placed in one region and, if the customer has global presence, device from other regions are being managed by separate tool. In this design, there is no synchronization across any of these devices. If an upgrade in software is required, it is a major change and typically the whole monitoring tool has to be decommissioned before upgrade. Thus, these pairs of non-customizable NMS tools are built for limited sizing, scale and deployment.

In one embodiment, the controller changes this monolithic way of deploying management software by leveraging a fully distributed in memory and historical archived database, which allows it to be deployed in many difference data centers and automatically they are state synchronized globally. For example and in one embodiment, the archival database can be an Apache Hadoop™database and the in memory database is a Hazelcast™database. Moreover, a fully customizable graphical user interface (GUI) can be used (e.g., a fully customizable hypertext markup language (HTML) 5 GUI). In another embodiment, an alternative database can be used. This allows the operations team to have one global central view that can be managed from any device, and any device can be brought out of service to be serviced or upgraded without impacting the rest of the cluster.

Even today with the advent of so much automation, network elements are still being configured manually and images deployed by physically installed those images (e.g., sneaker-net). For example and in one embodiment, an administrator of the customer would manually provision each network switch separately. To resolve the above problem, customers can use Zero Touch Provisioning (ZTP) to provision various network elements. ZTP allows the customer to be able to take a network element out of the box, rack and stack that network element, and automatically provision this network element with an automatically generated configuration, golden image, or script without an human intervention.

However, there was no turnkey way to orchestrate the ZTP process using a network wide view. The controller's 'Network Provisioning' portal process allows an end user to create a logical network design diagram view to ensure devices are being provisioned with a data center leaf/spine topology view or any other network topology view, which represents the final deployment design. When network switches are managed, typically a configuration, image, and/or script are used to provision and manage change controls for that switch. The 'Network Provisioning' portal allows customer to be able to able to perform all three actions at same time in a network wide view.

ZTP solutions are used for automating the initial deployment of a network element in the infrastructure. To obtain operational expense cost reductions of managing the asset during the life cycle of its deployment in the data center, the controller expands the scope of 'Zero Touch Provisioning' by using a single process called 'Network Provisioning' for the provisioning of every change management process. Now customers have the freedom to use a turnkey portal based ZTP solution to provision the device initially and throughout its useful lifespan using a single provisioning process. Thus, and in one embodiment, a customer using ZTP can automatically provision network elements in the network centrally using a network wide view.

Typically enterprise customers perform change controls outside production hours and request a change control window. When the change control window starts, the engineer performing the change will perform pre-change control procedures e.g. capturing switch interface status, virtual local area network (VLAN) status, Internet Protocol (IP) routing status, multicast status, Access Control Lists (ACLs), Quality of Service (QoS) configuration etc. using a number of show commands. These scripts may be run on a single device on a larger set of devices depending on the size of the change. Once the change has been completed, the engineer will most probably run exactly the same scripts again. The reason these scripts are run is to ensure that the delta performed during the change is per expectation. The way to ensure this delta is accurate is if the engineer were to manually compare the pre & post change status. If the change impacts a large number of devices, it is not manually possible to ensure 100% accuracy and there is a reliance on sample-based confirmation, which substantially increases the risk of the change. Typically depending on the device or the complexity of the change, verifying the change manually can take an hour per device.

To be able to eliminate this seriously manual process and to be able to substantially increase the accuracy of the change control, the controller presents change control status via a 'Snapshot Mode.' This approach leverages the underlying database principles of Sysdb described above. By capturing various fields or states of the Sysdb database for each network element before and after the change and by being able to report them per device or by a set of devices (referred to as 'Containers') drastically reduces the time of performing the change control. For example and in one embodiment, the controller can take snapshots of network elements (or snapshots for network elements in a group) as described above with reference to FIG. 4.

In addition, and in one embodiment, the controller improves upon the change control for network elements, by introducing new modes on the switch called 'Maintenance' and 'Production' mode. Maintenance mode allows the customer to take the whole networks or selected parts of the network out of service without impacting application traffic. The maintenance mode allows the network operators to make changes these parts of the network with impacting the application traffic. Maintenance mode is further described above in FIG. 5.

Once the change control is complete, the network can now be bought back into 'Production mode' that is the reverse process of 'Maintenance' mode. The user can fully automate the steps and control any part of the removal or re-entry into the network. Coupling the Maintenance mode with the 'Snapshot' mode provides the engineer performing the change control the confidence to make changes on the network without having any application impact and thereby reducing operational expense again.

Typically if a change control has not gone smoothly, the engineer(s) performing the change have to roll-back their change, for example a change to a configuration, image or script. The engineer would have to do rollback methodically and manually and step-by-step and device-by-device.

The controller alleviates this problem by acting similar to a video recorder as the controller continually capturing state of a network element before and after a change control. In one embodiment, as a network element is being updated with a new software or feature, the network element will go through a series of states. The controller captures each state for this network element as the network element progresses through these changes. With these set of state captures, the controller can rewind the states, so that this network element can be rolled back to a previous state as needed. Additionally, as the controller includes a network wide aggregated database that is capturing states of some or all devices on the network, it is very easy to for the user to use a timeline pointer to simply move the state of the network forward or backward. This gives the user the flexibility either by device or by containers (set of devices) to rewind the configuration, image and/or script on the switch(es) easily. Thus, a network-wide rollback is available. Once again, coupled with the state of the Snapshot Mode, the engineer can have the confidence that roll-back state was performed with the highest level of accuracy with any anomalies highlighted on the Service Dashboard. In one embodiment, the controller can rollback or roll-forward a state for configurations, images, and/or scripts. Network-wide rollback is further described in FIG. 3 above.

In one embodiment, when users run automation scripts on the network, the running of these scripts is done with great caution because if the script is broken or if the automated change has unintended repercussions, there is typically no way to stop the script part way.

The controller provides the ability to use scripting with greater confidence by breaking down the change control into a smaller set of devices, or batches. As the script is deployed, rolling snapshots are performed and baselined per batch to ensure the script is getting deployed successfully. If the baseline of the change deviates from the intended expectation, then the change control can automatically be rolled back to the last successfully deployed batch or fully rollback to the original state of the network prior to the change control. This can drastically reduce the operational risk of change controls and further drive down operational expenses.

In one embodiment, in a cloud network spine leaf design, it is important to be able to be able to track workflows. Without visibility, the network operators are driving blind to determine outage causes or capacity planning. The controller further includes a number of innovative features to enable workflow visibility in a spine leaf architecture troubleshooting to reduce mean time to repair (MTTR) of a network. When a network element has a hardware or software issue, the network operator(s) will call the networking vendor technical assistance center to help troubleshoot the issue. The technical assistance center to request a 'show tech-support' to capture the state of the network when the network is underperforming. Depending on the device, such report can be very lengthy, complex and very difficult to understand by the network operators and very often are only interpreted by the networking vendor support or development teams.

In one embodiment, the controller introduces a new concept called 'Switch Health Status'. In this embodiment, the 'Switch Health Status' is a human readable form of the 'show tech-support' of the command with correlation directly on the portal to be able to capture the state of the switch and be able to quickly interpret the health of the device thereby reducing the MTTR of the outage.

As demand on a network increases with the onset of virtualization, consolidation, IP storage, Hadoop, there will be times of congestion on the network. When there is congestion on the network, the network elements have a feature called 'LANZ' (Latency ANalyZer) that can highlight proactively when there was congestion and the impact of the latency. However, this is by box and not holistically for a network.

In one embodiment, the controller helps the network operator to manage the health and congestion network wide and to report any hot spots there may be on a specific port or link. This allows the operator of a customer to quickly move workloads and workflows to less demanding resources on the network.

Most organizations are moving to a virtual world and typically have virtualized their compute environments using hypervisor-based solutions up to 80% to 90%. However, if there is a production issue, it is very difficult to correlate the virtualized world to the compute and network world. A feature called 'VMTracer' can provide this correlation quickly within command line for that switch.

The controller provides this feature with a network wide view, so that in the portal, it will be very easy to search and find any virtual machine, and see this virtual machine's state. This reducing the operating challenges and making it easier to run a tightly integrated overlay and underlay network.

The controller further has now consolidated a Tap Aggregation portal into a consolidated view within the overall portal on the controller. This gives the customer a common starting point to be able to operate their tap aggregation network. In one embodiment, the centralized tap aggregation portal of the controller allows a customer to easily program tap and tool ports.

There are various ways to implement Virtual eXtended Local Area Network (VXLAN) control plane functionality using multicast or BGP. However these approaches are not plug-n-play solutions and are not open to integrate with software defined network (SDN) Controllers.

In one embodiment, the controller provides a simplified approach to deploy VXLAN overlays for mobility within the data center. Using open standards-based APIs like OVSDB or JSON, the controller is the platform for integration with Arista's ecosystem of orchestration, overlay controller, and service delivery partners.

In a further embodiment, visibility is key within a network monitoring tool set for quick identification of issues. Traditional network monitoring tools do not provide visibility into overlay VXLAN tunnels.

In this embodiment, the controller bridges this gap in monitoring tools and provides a topological view of the overlay network that helps with troubleshooting and monitoring the environment. The controller further increases the visibility of the overlay network by stitching the virtual hosts and tunnel to the physical network ports and providing a centralized view within the portal. This allows the network designers and operators to make changes in the network with a higher degree of confidence.

Most VXLAN control protocols are run on the network switches themselves. If there is an outage, there will be huge convergence on the overlay network because all the devices that are part of the VXLAN will have to relearn the state of the virtual environment.

The controller can be deployed in a clustered high availability mode with three servers in active/active state. In the event of a cluster outage, there is no convergence in the network, and the overlay network is un-interrupted, thereby maintaining a high availability at all times. In one embodiment, this high availability of the cluster prevents the relearning of the VXLAN state in the network.

In one embodiment, SDN controllers tend to be focused on the overlay network itself and are not tightly coupled with the underlay network.

The controller provides that openness to serve as a central integration point to other 3rd party controllers, such as VMware NSX, Microsoft, Nuage, etc. The controller further provides a scalable solution as it does not require the $3^{rd}$ party controllers to talk to every single network element. Instead, the SDN controller(s) simply communicate with the controller's central integration point, which will then communicate the overlay information to the rest of the Virtual Tunnel End Points (VTEPs) of the VXLAN segments in the VXLAN.

In addition to supporting tight OpenStack integration, the controller is fully open to supporting any customized controller that the customer may want to deploy. This provides the customer the choice of not being locked into any single overlay vendor.

The controller also provides the ability for the customer to integrate and onboard other best of breed vendors, such as Palo Alto, HP, Splunk, Corvil to name a few. This provides the flexibility to be able to integrate and write scripts to integrate their environment with any 3rd party vendor to manage the network.

Figure 9:
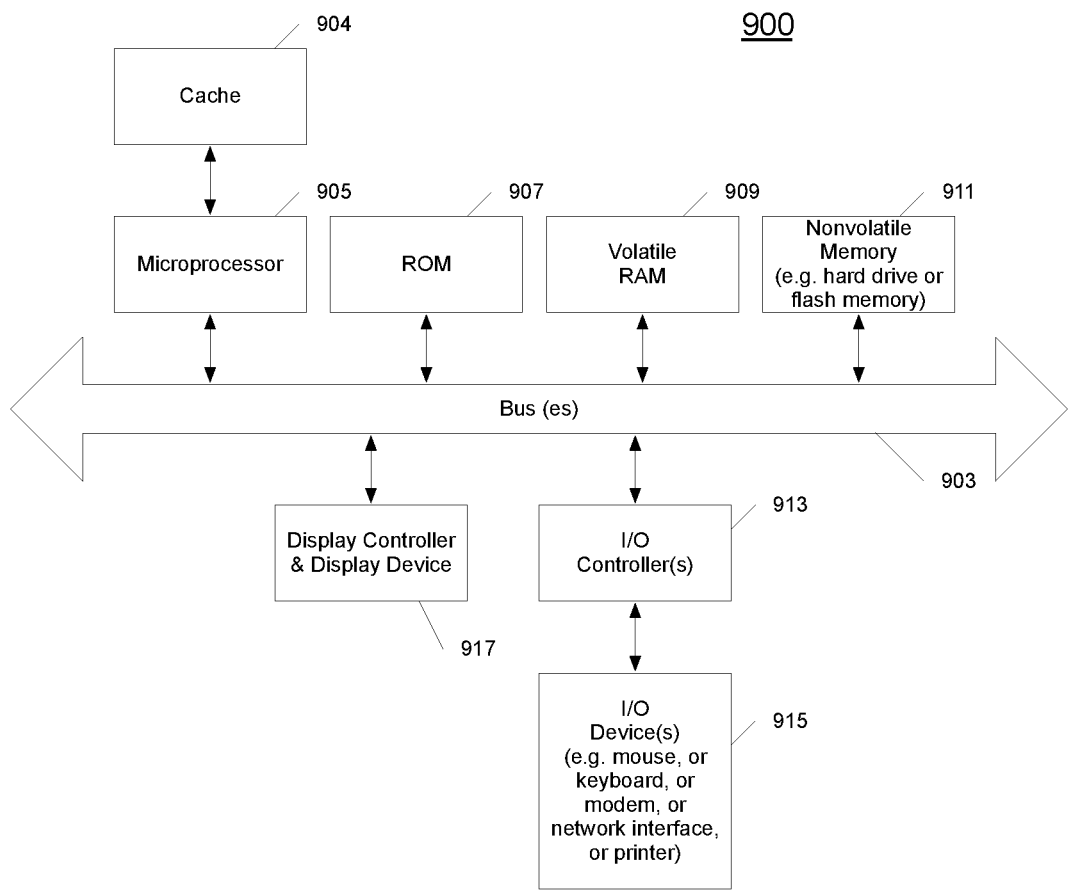
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a controller 102 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903, which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "updating," "failing," "signaling," "configuring," "increasing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units in a controller to perform a method to update boot images of a network segment of a network, the method comprises:
   receiving a configuration point for the network segment, the network segment includes a heterogeneous mix of a plurality of network elements; and
   for each of the plurality of network elements in the network segment,
      identifying a boot image for that network element corresponding to the configuration point,
      updating the network element, wherein the network element is updated without rebooting the one or more processing units of the controller, and
      validating the updated network element,
   wherein the configuration point represents a roll forward of the boot image of at least one network element to a higher version boot image that allows the at least one network element to use a new function of the boot image.

2. The machine-readable medium of claim 1, wherein the configuration point represents a rollback of the boot images for the plurality of network elements to a lower version boot image.

3. The machine readable medium of claim 1, wherein the rollback of the boot images for the plurality of network elements restores the network segment to a previously stable configuration.

4. The machine-readable medium of claim 1, wherein the method further comprises:
determining whether the boot images of the network segment have been successfully updated; and
in response to determining that the boot images of the network segment have been successfully updated, signaling that the boot images of the network segment have been successfully updated.

5. The machine-readable medium of claim 4, wherein the method further comprises:
in response to determining that the boot images of the network segment have not been successfully updated, performing one or more of:
signaling that the boot images of the network segment have not been successfully updated; and
rolling back the boot images of the network segment.

6. A method in a controller to update boot images of a network segment of a network, the method comprises:
receiving a configuration point for the network segment, the network segment includes a heterogeneous mix of a plurality of network elements; and
for each of the plurality of network elements in the network segment,
identifying a boot image for that network element corresponding to the configuration point,
updating the network element, wherein the network element is updated without rebooting the one or more processing units of the controller, and
validating the updated network element
wherein the configuration point represents a roll forward of the boot image of at least one network element to a higher version boot image that allows the at least one network element to use a new function of the boot image.

7. The method of claim 6, wherein the configuration point represents a rollback of the boot images for the plurality of network elements to a lower version boot image.

8. The method of claim 6, wherein the rollback of the boot images for the plurality of network elements restores the network segment to a previously stable configuration.

9. The method of claim 6, further comprising:
determining whether the boot images of the network segment have been successfully updated; and
in response to determining that the boot images of the network segment have been successfully updated, signaling that the boot images of the network segment have been successfully updated.

10. The method of claim 9, further comprising:
in response to determining that the boot images of the network segment have not been successfully updated, performing one or more of:
signaling that the boot images of the network segment have not been successfully updated; and
rolling back the boot images of the network segment.

11. An apparatus for updating boot images of a network segment of a network, the apparatus comprising:
a memory configured to store data; and
a processor coupled to the memory, the processor to:
receive a configuration point for the network segment, the network segment includes a heterogeneous mix of a plurality of network elements; and
for each of the plurality of network elements in the network segment,
identify a boot image for that network element corresponding to the configuration point,
update the network element, wherein the network element is updated without rebooting the one or more processing units of the controller, and
validate the updated network element
wherein the configuration point represents a roll forward of the boot image of at least one network element to a higher version boot image that allows the at least one network element to use a new function of the boot image.

12. The apparatus of claim 11, wherein the configuration point represents a rollback of the boot images for the plurality of network elements to a lower version boot image.

13. The apparatus of claim 12, wherein the rollback of the boot images for the plurality of network elements restores the network segment to a previously stable configuration.

14. The apparatus of claim 11, wherein the processor is further configured to:
determine whether the boot images of the network segment have been successfully updated; and
in response to determining that the boot images of the network segment have been successfully updated, signal that the boot images of the network segment have been successfully updated.

* * * * *